United States Patent [19]

Osanai et al.

[11] Patent Number: 4,658,360

[45] Date of Patent: Apr. 14, 1987

[54] METHOD AND APPARATUS FOR CONTROLLING CONTINUOUSLY VARIABLE TRANSMISSION FOR VEHICLE

[75] Inventors: Akinori Osanai, Susono; Takao Niwa, Toyota; Takeshi Gono, Susono, all of Japan

[73] Assignee: Toyota Jidosha Kabushiki Kaisha, Toyota, Japan

[21] Appl. No.: 645,285

[22] Filed: Aug. 29, 1984

[30] Foreign Application Priority Data

Sep. 1, 1983 [JP] Japan .................................. 58-160899

[51] Int. Cl.$^4$ ............................................. B60K 41/12
[52] U.S. Cl. ................................. 364/424.1; 74/866; 474/18
[58] Field of Search ............... 364/424.1; 74/856–866, 74/877; 474/12, 18, 28

[56] References Cited

U.S. PATENT DOCUMENTS

| 4,161,894 | 7/1979 | Giacosa | 74/863 |
| 4,459,878 | 7/1984 | Frank | 74/866 |
| 4,466,521 | 8/1984 | Hattori et al. | 74/866 |
| 4,509,125 | 4/1985 | Fattic et al. | |
| 4,515,040 | 5/1985 | Takeuchi et al. | 74/864 |
| 4,516,652 | 5/1985 | Tanigawa et al. | |
| 4,543,855 | 10/1985 | Oetting et al. | 74/859 |
| 4,546,673 | 10/1985 | Shigematsu et al. | 74/865 |

FOREIGN PATENT DOCUMENTS 0059426 8/1982 European Pat. Off. .

Primary Examiner—Parshotam S. Lall
Attorney, Agent, or Firm—Oblon, Fisher, Spivak, McClelland & Maier

[57] ABSTRACT

Method and apparatus for controlling a continuously variable transmission operatively connecting an engine and drive wheels of a vehicle, wherein a speed ratio of the transmission is controlled such that an actual engine speed coincides with a target engine speed. The method and apparatus comprise steps or devices for: determining a first target speed based on a currently required output of the engine; determining a second target speed based on a predetermined transmission efficiency of the transmission and on the first target speed, the second target speed being lower than the first target speed; determining a variation-resistant trigger speed based on a detected running speed of the vehicle, the trigger speed being within a speed range in which the engine provides a sufficient output necessary to permit desired acceleration of the vehicle; restraining a rate of variation in the speed ratio while the actual engine speed is raised from the trigger speed to the first target speed; and switching the target engine speed from the first target speed to the second target speed when the actual engine speed has been raised to the first target speed, whereby the engine speed is lowered from the first target speed to the second target speed. When the second target speed is reached, the second target speed is changed to the first target speed.

8 Claims, 10 Drawing Figures

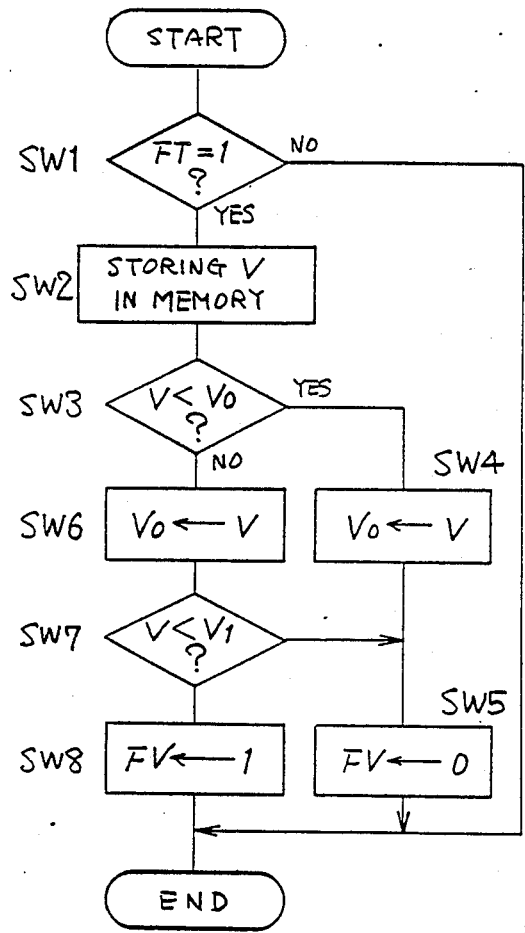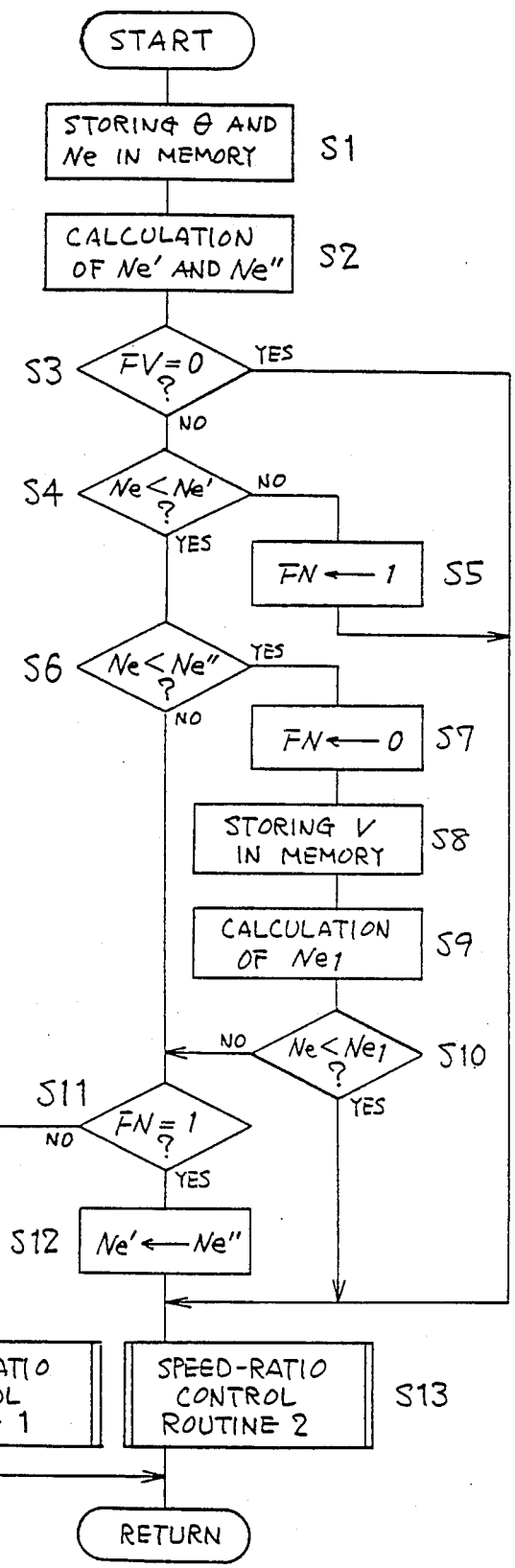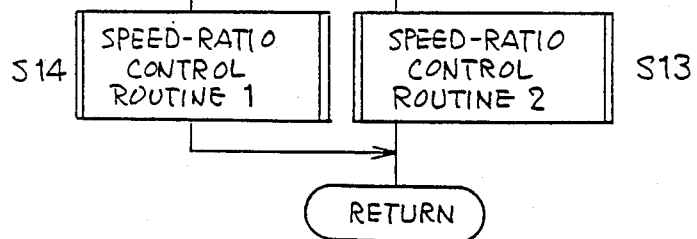

METHOD AND APPARATUS FOR CONTROLLING CONTINUOUSLY VARIABLE TRANSMISSION FOR VEHICLE

BACKGROUND OF THE INVENTION

The present invention relates generally to a method and an apparatus for controlling a speed ratio of a continuously variable transmission for a vehicle, and more particularly to improvements in such method and apparatus for increased fuel economy of the vehicle during acceleration periods.

In the art of a continuously variable transmission for a vehicle to transmit a rotary motion of an engine to drive wheels with a continuously variable ratio, a control apparatus is known which comprises regulating means for controlling the speed ratio of the variable transmission (ratio of a rotating speed of its output shaft to a rotating speed of its input shaft) such that an actual speed of the engine coincides with a target speed thereof which is determined based on a currently required output of the engine and according to a predetermined relation between the target speed and the required output of the engine. With such a known control apparatus to control the speed ratio of a variable transmission, the actual engine speed is controlled into conformity with a target engine speed which is continuously or intermittently determined so that the specific-fuel consumption is minimum. Thus, the control apparatus permits the transmission and the engine to operate with a high fuel economy over an entire range of the vehicle speed, particularly while the vehicle is running in a relatively stable conditions or at a relatively constant speed. However, when the vehicle is accelerated at a high rate, particularly when it is desired to achieve a quick acceleration of the vehicle with an abrupt depression of an accelerator pedal in a relatively large amount, for example, all the way to its full-speed or full-stroke position, the target speed of the engine is rapidly increased to a level corresponding to the amount of depression of the accelerator pedal (representative of the required output of the engine). As a result, the speed ratio of the variable transmission is changed or controlled so that the actual engine speed is rapidly increased to keep up with the rapidly increasing target speed. Hence, the engine tends to operate with increased noises, and the driving comfort of the vehicle is reduced. Further, it is generally recognized that the transmission efficiency is unavoidably decreased in a process of change in the speed ratio of the variable transmission. This means that a rapid change in the speed ratio during acceleration of the vehicle causes a reduction in the transmission efficiency, and consequently a decrease in the fuel economy of the vehicle. In short, the known apparatus for controlling a continuously or steplessly variable transmission suffers the problems of high operating noises and relatively low fuel economy of the engine.

SUMMARY OF THE INVENTION

Is is therefore an object of the present invention to provide improved method and apparatus for controlling a continuously variable transmission for a vehicle, which are capable of assuring minimum operating noises of the engine during quick acceleration of the vehicle, and maintaining a high fuel economy of the engine even while the vehicle is in acceleration.

According to the invention, there is provided a method of controlling a speed ratio of a continuously variable transmission for a vehicle for transmitting a rotary motion of an engine to drive wheels of the vehicle with a stepless speed change, by regulating the speed ratio of the transmission such that an actual speed of the engine coincides with a target engine speed, said method comprising the steps of: (a) determining a first target speed based on a currently required output of the engine and according to a predetermined relation between the first target speed and the required output of the engine, the first target speed being normally used as the target engine speed to regulate the speed ratio of the transmission; (b) detecting a running speed of the vehicle; (c) determining a second target speed based on a predetermined transmission efficiency of the transmission and on the first target speed, the second target speed being lower than the first target speed (d) determining a variation-restraint trigger speed of the engine based on the detected running speed of the vehicle and according to a predetermined relation between the variation-restraint trigger speed and the running speed of the vehicle, the variation-restraint trigger speed being within a speed range in which the engine provides a sufficient output necessary to permit desirable acceleration of the vehicle at the detected running speed of the vehicle; (e) restraining a rate of variation in the speed ratio of the transmission during a first time span between a first moment when the actual speed of the engine has exceeded the variation-restraint trigger speed, and a second moment when the actual speed has reached the first target speed, while the vehicle is in acceleration; and (f) selecting the second target speed as said target engine speed when the actual speed of the engine has been raised to the first target speed with the restrained rate of variation in the speed ratio of the transmission during acceleration of the vehicle, the second target speed being used to regulate the speed ratio of the transmission during a second time span between said second moment and a third moment when the actual speed of the engine has been lowered to the second target speed.

According to the invention, there is also provided an apparatus for practicing the above method of the invention, including regulating means for controlling the speed ratio of the transmission such that an actual speed of the engine coincides with a target engine speed, the apparatus comprising: (a) means for determining a first target speed based on a currently required output of the engine and according to a predetermined relation between the first target speed and the required output of the engine, the first target speed being normally used as the target engine speed to regulate the speed ratio of the transmission; (b) means for detecting a running speed of the vehicle; (c) means for determining a second target speed based on a predetermined transmission efficiency of the transmission and on the first target speed, the second target speed being lower than the first target speed (d) means for determining a variation-restraint trigger speed of the engine based on the detected running speed of the vehicle and according to a predetermined relation between the variation-restraint trigger speed and the running speed of the vehicle, the variation-restraint trigger speed being within a speed range in which the engine provides a sufficient output necessary to permit desirable acceleration of the vehicle at the detected running speed of the vehicle; (e) means for restraining a rate of variation in the speed ratio of the transmission during a first time span between a first moment when the actual speed of the engine has exceeded the variation-restraint trigger speed, and a second moment when the actual speed has reached the first target speed, while the vehicle is in acceleration; and (f) means for selecting the second target speed as said target engine speed when the actual speed of the engine has been raised to the first target speed with the restrained rate of variation in the speed ratio of the transmission during acceleration of the vehicle, the second target speed being used as said target engine speed by the regulating means during a second time span between said second moment and a third moment when the actual speed of the engine has been lowered to the second target speed.

In the present invention as described above, a first target speed of the engine is determined based on a currently required output of the engine, while a second target speed of the engine is determined based on a predetermined transmission efficiency of the transmission and on the first target speed. Further, a variation-restraint trigger speed is determined based on a currently detected running speed of the vehicle. The second target speed is lower than the first target speed, and the variation-restraint trigger speed is determined to fall within a speed range in which the engine provides a sufficient output necessary to permit desirable acceleration of the vehicle at the detected running speed. The variation or change in the speed ratio to be controlled by the regulating means is inhibited or at least restrained by the restraining means as soon as the actual speed of the engine has been raised to the variation-restraint trigger speed during acceleration of the vehicle. The restraint of variation in the speed ratio of the transmission continues until the actual engine speed has reached the first target speed. When the actual engine speed has been raised to the first target speed, the target speed of the engine is switched by the target speed selecting means from the first target speed to the second target speed which is lower than the first target speed. Consequently, the actual engine speed is lowered to the second target speed. In the above arrangement according to the invention, even a large amount of abrupt depression of the accelerator pedal will not cause a rapid rise of the engine speed to the first target speed. That is, the engine speed is smoothly increased with the vehicle speed while the rate of variation or change in the speed ratio of the transmission is held considerably restrained or inhibited. Hence, the operating noise level of the engine during acceleration of the vehicle is kept to a minimum, and the reduction in the transmission efficiency due to rapid change in the speed ratio is minimized. Accordingly, the instant control method or apparatus for a variable transmission assures enhanced driving comfort of the vehicle and improved fuel economy of the engine during acceleration of the vehicle.

According to one embodiment of the apparatus or method of the invention, the target engine speed is changed or switched from the second target speed to the first target speed at the end of the previously indicated second time span, whereby the engine speed is raised from the second target speed to the first target speed. In this period following the second time span, the rate of variation in the speed ratio of the transmission is again restrained as in the previously indicated first time span.

In the above embodiment, once the actual speed of the engine has been raised from the variation-restraint trigger speed to the first target speed, the actual engine speed is lowered and raised alternately between the first and second target speeds until the intended vehicle speed is reached. While the engine speed is raised from the second target speed to the first target speed, the rate of variation in the speed ratio of the transmission is restrained.

According to another embodiment of the invention, the second trigger speed is obtained by multiplying the first target speed by the predetermined transmission efficiency of the transmission.

According to a further embodiment of the invention, the transmission is of belt-and-pulley type, including a first variable-diameter pulley, a second variable-diameter pulley, and a transmission belt connecting the first and second variable-diameter pulleys.

BRIEF DESCRIPTION OF THE DRAWING

The above and other objects, features and advantages of the present invention will be better understood from reading the following description of the preferred embodiment taken in conjunction with the accompanying drawing in which:

FIGS. 6–8 are flow charts illustrating the operation of the embodiment of FIG. 1.

DETAILED DESCRIPTION OF THE PREFERRED EMBODIMENTS

Figure 1:
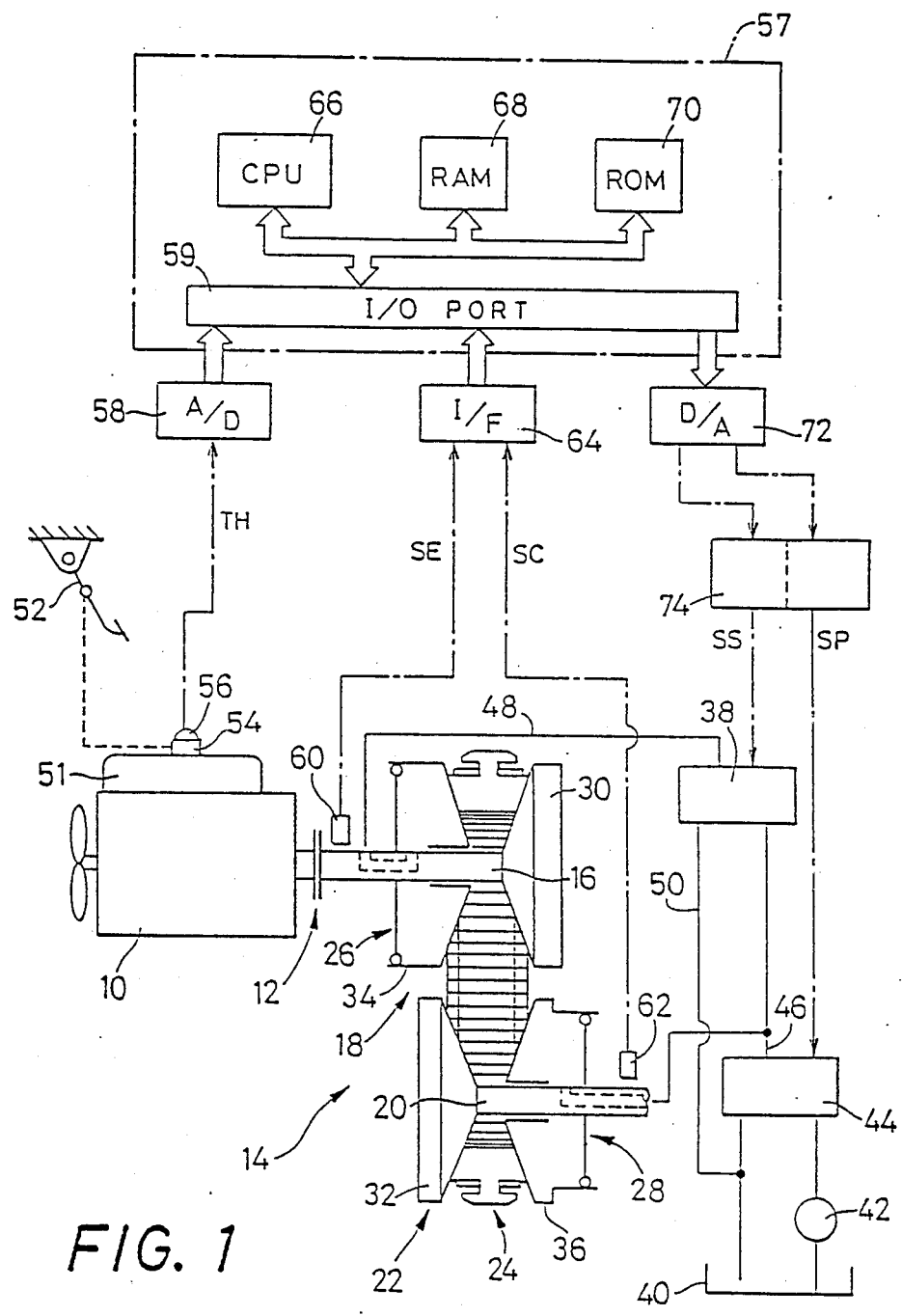
FIG. 1 is a schematic illustration of one embodiment of an apparatus of the invention for controlling a continuously variable transmission for a vehicle.

Referring to the accompanying drawing showing a preferred embodiment of the inventiion, there is shown in FIG. 1 a continuously variable transmission 14 (CVT 14) of belt-and-pulley type which is operatively connected to an engine 10 of a vehicle through a clutch 12. The variable transmission 14 serves to transmit the output of the engine 10 to drive wheels (not shown) of the vehicle such that a speed ratio of the engine 10 and the drive wheels relative to each other is steplessly variable. The variable transmission 14 comprises: a drive or input shaft 16 coupled to the clutch 12; a first variable-diameter pulley 18 having a variable effective diameter and associated with the input shaft 16; a driven or output shaft 20; a second variable-diameter pulley 22 having a variable effective diameter and associated with the output shaft 20; a transmission belt 24 connecting the first and second variable-diameter pulleys 18 and 22; and hydraulic cylinders 26 and 28 associated with the pulleys 18 and 22, respectively, to change widths of Vee-grooves of the pulleys 18, 22 for varying their effective diameters engaging the belt 24. The first pulley 18 includes an axially stationary rotor 30 fixed to the input shaft 16, and an axially movable rotor 34 which is mounted on the input shaft 16 axially slidably relative to the rotor 30 but not rotatable relative to the shaft 16. Similarly, the second pulley 22 includes an axially stationary rotor 32 fixed to the output shaft 20, and an axially movable rotor 36 mounted on the output shaft 20 slidably relative to the rotor 32 but not rotatable relative to the shaft 20. The movable rotors 34 and 36 are slidably moved on the respective input and output shafts 16 and 20 with a hydraulic pressure applied to pressure chambers in the hydraulic cylinders 26, 28, whereby the effective diameters of the first and second pulleys 18, 22 engaging the belt 24 may be continuously varied. The hydraulic cylinder 28 is normally subject to a line pressure of a hydraulic system, while the hydraulic cylinder 26 is subject to a variable hydraulic pressure which is adjusted through a speed-ratio control valve 38 incorporated in the hydraulic system. Thus, a balance of hydraulic pressures exerted on the movable rotors 34 and 36 is changed, and consequently the speed ratio of the output shaft 20 with respect to the input shaft 16 may be varied. In this connection, it is noted that the movable rotor 34 has a larger pressure receiving area than the movable rotor 36.

The hydraulic line pressure normally applied to the hydraulic cylinder 28 is obtained from a pressure control valve 44 which adjusts a pressure of a pressurized working fluid which is pumped by a pump 42 from an oil reservoir 40. The line pressure is fed to the hydraulic cylinder 28 and to the speed-ratio control valve 38 through a conduit 46. The pressure control valve 44 comprises a linear solenoid operable in response to a PRESSURE CONTROL signal SP which will be described, and further comprises a valving member driven by the linear solenoid. The line pressure supplied from the pressure control valve 44 is regulated by changing, according to the PRESSURE CONTROL signal SP, a relief amount of the fluid which is fed back to the oil reservoir 40 to relieve a part of the fluid pressure in the pressure control valve 44. The speed-ratio control valve 38 comprises a linear solenoid operable in response to a SPEED RATIO signal SS which will be described, and further comprises a valving member driven by the linear solenoid to control amounts of the working fluid which are supplied to or discharged from the hydraulic cylinder 26. More specifically described, the speed-ratio control valve 38 is connected to the hydraulic cylinder 26 through a conduit 48, and to the oil reservoir 40 through a drain conduit 50. A movement of the valving member of the speed-ratio control valve 38 in one direction enables the conduit 46 to communicate with the conduit 48, and permits a variation in area of their communication within the speed-ratio control valve 38, thereby adjusting an amount of the fluid to be supplied to the hydraulic cylinder 26. On the other hand, a movement of the valving member of the speed-ratio control valve 38 in the opposite direction enables the conduit 48 to communicate with the drain conduit 50, and permits a variation in area of their communication in the speed-ration control valve 38, thereby adjusting an amount of the fluid to be discharged from the hydraulic cylinder 26 back to the oil reservoir 40. While the valving member of the speed-ratio control valve 38 is placed in its neutral position at which the conduit 48 is held in a substantially disconnected relation with both of the conduits 6 and 50, the amount of the pressurized fluid (hydraulic pressure) within the hydraulic cylinder 26 is held substantially constant and consequently the movable rotor 34 is located at a fixed axial position on the input shaft 16, whereby the speed ratio of the transmission 14 is held constant. When the conduit 48 is brought into communication with the conduit 46 due to the movement of the valving member of the speed-ratio control valve 38, the amount of the fluid (hydraulic pressure) within the hydraulic cylinder 26 is increased and consequently the movable rotor 34 is moved away from the stationary rotor 30, with a result of increasing the effective diameter of the first pulley 18 and decreasing that of the second pulley 22, whereby the speed ratio of the transmission 14 is made higher. Conversely, when the conduit 48 is put into communication with the drain conduit 50, the movable rotor 34 is moved towards the stationary rotor 30, whereby the speed ratio is lowered.

The engine 10 is provided with an intake manifold 51 in which is disposed a throttle valve 54 linked with an accelerator pedal 52. An opening angle $\theta$ of the throttle valve 54 is detected by a throttle sensor 56 which is attached to the throttle valve 54 as means for detecting a currently required output of the engine 10. The throttle sensor 56 generates a voltage signal, i.e., a THROTTLE signal TH which corresponds to the opening angle $\theta$ of the throttle valve 54. The THROTTLE signal TH is applied to an I/O (input/output) port 59 of a microcomputer 57 through an A/D (analog/digital) converter 58. Adjacent to the input and output shafts 16 and 20, there are respectively disposed a first and a second rotation sensor 60, 62. The first rotation sensor 60 serves as engine speed detecting means which detects a rotating speed of the input shaft 16 and produces an INPUT ROTATION signal SE whose number of pulses corresponds to the number of revolution of the engine 10. On the other hand, the second rotation sensor 62 serves as vehicle speed detecting means which detects a rotating speed of the output shaft 20 and produces an OUTPUT ROTATION signal SC whose number of pulses corresponds to a running speed of the vehicle. These INPUT and OUTPUT ROTATION signals SE and SC are fed to an I/F circuit (interface circuit) 64, which converts the ROTATION signals SE and SC into coded signals which represent the number of pulses per unit time of the signals SE, SC. These coded signals are applied to the I/O port 59.

The I/O port 59 is connected through a data bus line to a CPU 66 (central processing unit), a RAM 68 (random-access memory), and a ROM 70 (read-only memory). The CPU 66 is operated according to a program which is stored in the ROM 70 provided as one memory means, and utilizes a temporary data storage function of the RAM 68 which is provided as another memory means. The CPU 66 thus cooperated by the RAM 68 and the ROM 70, processes signals to be fed to the I/O port 59. Further, the CPU 66 feeds to a D/A (digital/analog) converter 72 and a driver circuit 74 the SPEED RATIO signal SS representing a speed ratio "e" and a variation rate "ė" ($=\Delta e/\Delta t$) at which the speed ratio "e" is varied. The CPU 66 further feeds to the converter 59 and the driver circuit 74 the PRESSURE CONTROL signal SP representing the line pressure of the hydraulic system. The driver circuit 74, which is a power amplifier, amplifies the SPEED RATIO and PRESSURE CONTROL signals SS, SP from the D/A converter 72 and applies the amplified SPEED RATIO and PRESSURE CONTROL signals SS, SP to the linear solenoids of the speed-ratio control valve 38 and the pressure control valve 44.

Figure 2A:
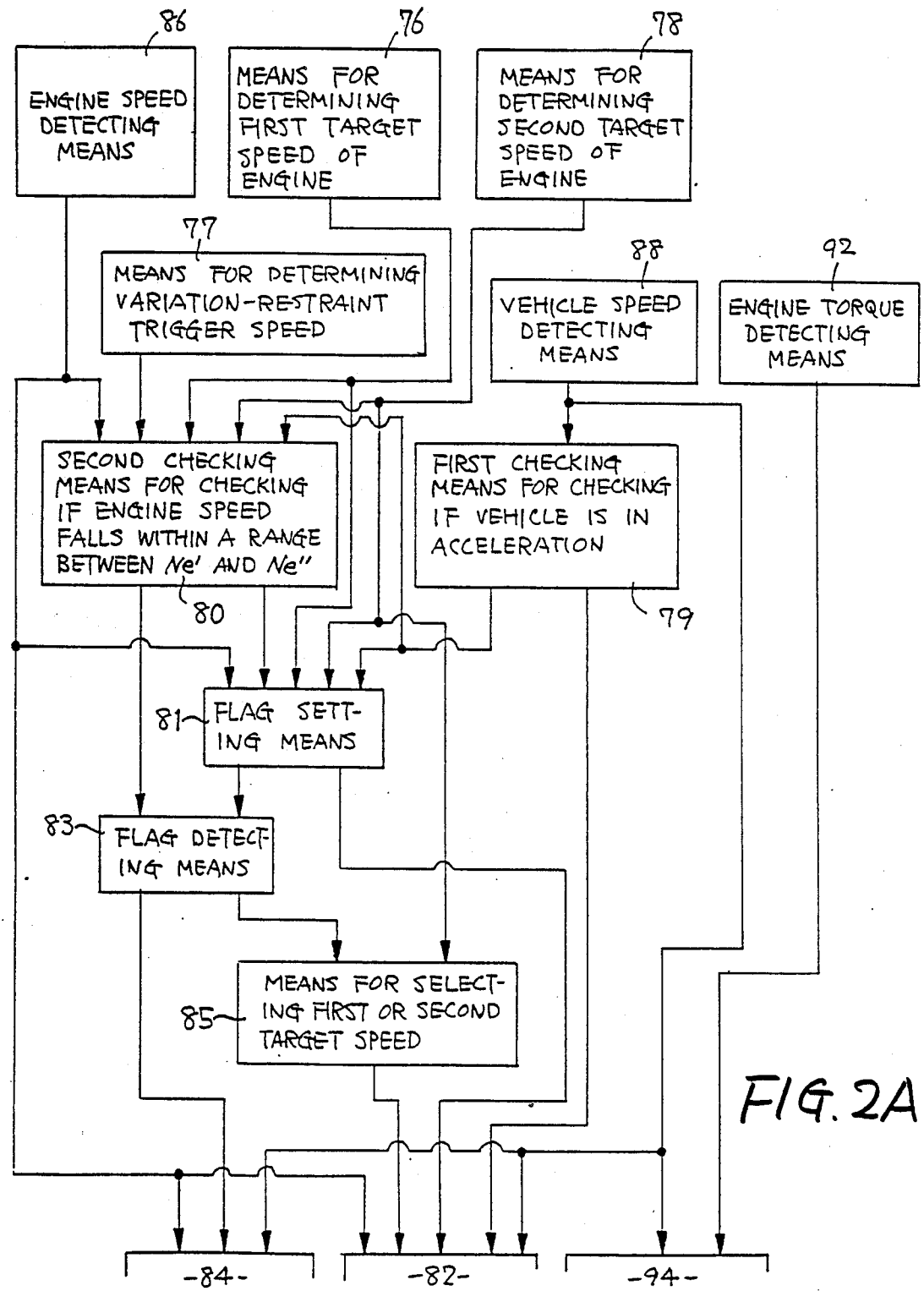
FIGS. 2A and 2B are schematic block diagrams generally showing a control arrangement for the transmission of FIG. 1.
Figure 2B:
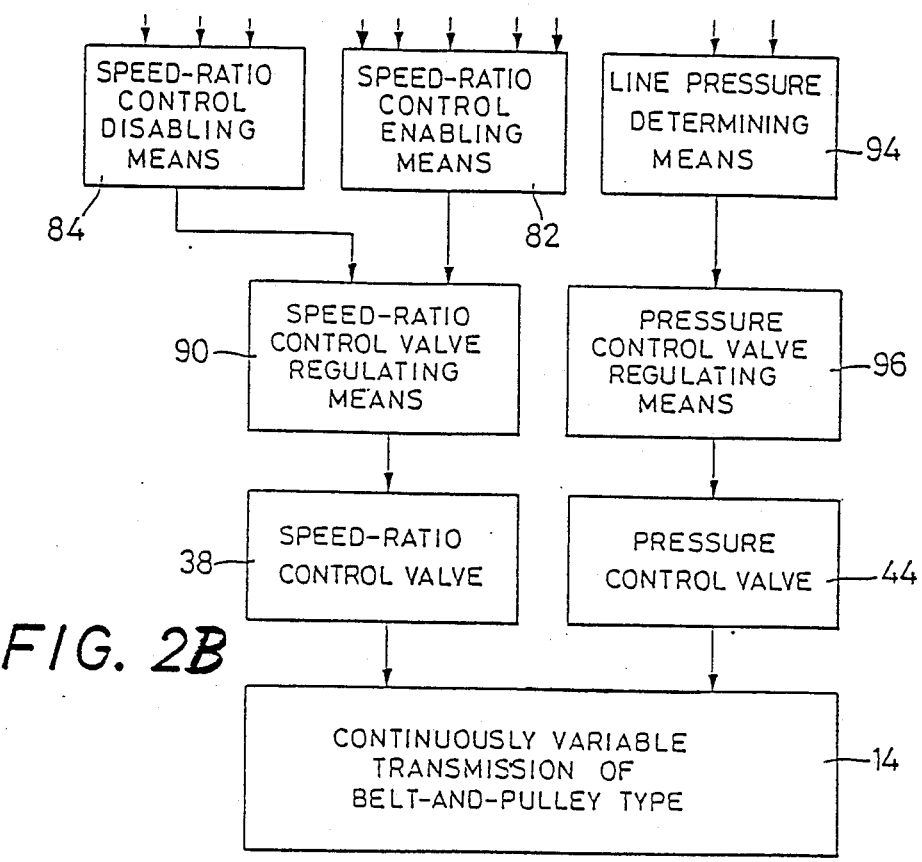
Figure 3:
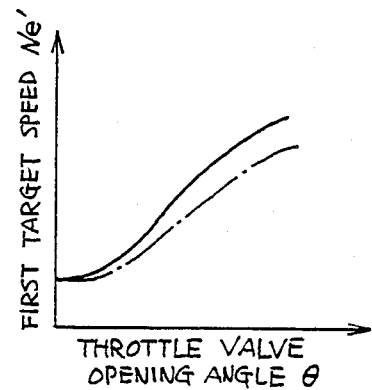
FIG. 3 is a graphical representation of a characteristic relation between an angle of a throttle valve opening, and a first target speed of the vehicle engine.
Figure 4:
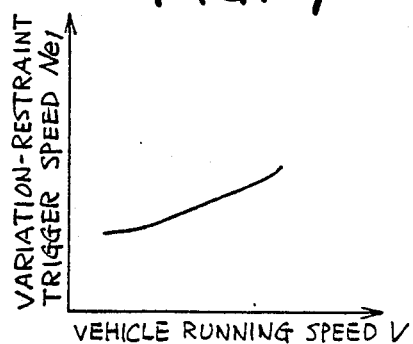
FIG. 4 is a graphical representation of a characteristic relation between a running speed of the vehicle and a variation-restraint trigger speed of the engine.

FIG. 2 is a schematic diagram generally showing a control arrangement for the variable transmission 14. First target speed determining means 76 determines a first or upper target speed Ne' of the engine 10 (rotating speed of the input shaft 16) based on the opening angle $\theta$ of the throttle valve 54 represented by the THROTTLE signal TH, and according to a predetermined stored relation between the opening angle $\theta$ and the first or upper target engine speed Ne', which relation is represented by a graph of FIG. 3. The first target engine speed Ne' is determined such that the required horsepower of the engine 10 (required engine output) represented by the opening angle $\theta$ of the throttle valve 54 is obtained with a minimum specific fuel consumption. Means 77 determines a later described variation-restraint trigger speed $Ne_1$ based on an actual running speed of the vehicle and according to a predetermined stored relation between the trigger speed $Ne_1$ and the running speed of the vehicle, which relation is represented by a graph of FIG. 4. Means 78 determines a second target speed Ne'' by multiplying the first target engine speed Ne' by a predetermined efficiency $\eta$ of the variable transmission 14. This efficiency $\eta$ is a common value, e.g., 90%, which is usually obtained during acceleration of the vehicle. First checking means 79 activates second checking means 80 if the vehicle is in acceleration, but activates speed-ratio control enabling means 82 if the vehicle is in deceleration. The second checking means 80 checks if the actual speed Ne of the engine 10 detected by engine speed detecting means 86 falls within a range between the first target speed Ne' and the second target speed Ne'', or not. If the actual engine speed Ne falls within the above-identified range, the second checking means 80 selects flag detecting means 83 which detects the content of a flag FN. If the actual engine speed Ne does not fall within the above range, the second checking means 80 selects flag setting means 81 which sets the flag FN in one of two states, i.e., "1" or "0" according to whether the actual engine speed Ne is higher than the first target speed Ne' or lower than the second target speed Ne''. The flag detecting means 83 detects the content of the flag FN set by the flag setting means 81 when the checking by the second checking means 80 reveals that the actual engine speed Ne is within the range between the first and second target speeds Ne' and Ne''. The flag detecting means 83 activates speed-ratio control disabling means 84 if the actual engine speed Ne detected in the last cycle of control of the transmission 14 according to this invention is lower than the second target speed Ne'', but activates selecting means 85 if the actual engine speed Ne in the last cycle is higher than the first target speed Ne'. Normally, the transmission 14 is controlled by the speed-ratio control enabling means 82 such that the actual engine speed Ne coincides with the first (upper) target engine speed Ne'. However, as soon as the actual engine speed Ne has been raised to the first target speed Ne' during acceleration of the vehicle, the selecting means 85 selects the second or lower target speed Ne'' which is lower than the first target speed Ne'. As described later in more detail, once the actual engine speed Ne has been raised to the first target speed Ne'' in a manner as described later, the engine speed Ne is lowered to the second target speed Ne''.

The speed-ratio control enabling means 82 determines an actual speed ratio "e" of the variable transmission 14 based on the actual running speed V of the vehicle detected by vehicle speed detecting means 88 (i.e., based on actual rotating speed No of the output shaft 20 detected by the second rotation sensor 62), and based on the actual engine speed Ne. Simultaneously, the speed-ratio control enabling means 82 determines a target speed ratio "e'" of the transmission 14 for coincidence of the actual engine speed Ne with the first target engine speed Ne', and directs regulating means 90 for controlling the speed-ratio control valve 38 and thereby controlling the variable transmission 14 such that a difference between the actual speed ratio "e" and the target speed ratio "e'" is zeroed. The disabling means 84 causes the target speed ratio "e'" to be replaced by the actual speed ratio "e" and interrupts or inhibits a change in the speed ratio of the transmission 14, thereby controlling the actual engine speed Ne for coincidence with the first target engine speed Ne' without changing the speed ratio "e" of the transmission 14. The speed-ratio control valve regulating means 90 feeds the SPEED RATIO signal SS to the speed-ratio control valve 38, which is operated in response to the SPEED RATIO signal SS to vary the speed ratio "e".

Figure 5:
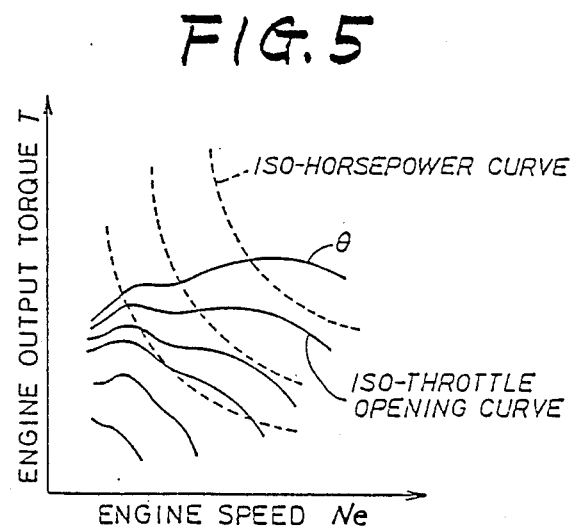
FIG. 5 is a graph representing iso-horsepower curves and iso-throttle valve opening curves as a function of engine speed and engine output torque of the vehicle.

Engine torque detecting means 92 detects an actual output torque T based on the opening angle $\theta$ of the throttle valve 54 (representing the currently required output of the engine 10) and on the actual engine speed Ne, and according to a predetermined and stored relation among the actual engine speed Ne, throttle valve opening angle $\theta$ and engine output torque T, which relation is represented by a graph of FIG. 5. Line pressure determining means 94 determines a line pressure in the conduit 46 based on the actual output torque T of the engine 10, actual engine speed Ne detected by the engine speed detecting means 86 (60), and actual rotating speed No of the output shaft 20 detected by the vehicle speed detecting means 88 (62), and according to a predetermined relation among the above values T, Ne and No. To establish the line pressure determined by the line pressure determining means 94, regulating means 94 feeds the PRESSURE CONTROL signal SP to the pressure control valve 44 to regulate the operation of the valve 44. As a result, the line pressure is maintained at a minimum level necessary to prevent a torque transmission loss due to slip of the belt 24 on the pulleys 18, 22, whereby otherwise possible power loss and shortened service life of the belt 24 due to excessive tension thereto may be avoided.

Referring next to a flow chart of FIG. 6, the operation of the present invention will be described.

At first, step S1 is executed to store in the RAM 68 data on the opening angle $\theta$ of the throttle valve 54 and data on the actual engine speed Ne, according to the THROTTLE and INPUT ROTATION signals TH and SE. Step S1 is followed by step S2 which corresponds to the first and second target speed determining means 76 and 78 previously indicated. In step S2, the first target speed Ne' indicated in solid line in FIG. 3, and the second target speed Ne'' indicated in broken line in the same figure, are calculated based on the opening angle $\theta$ of the throttle valve 54 and according to the predetermined stored relation of FIG. 3 among the opening angle $\theta$, first target speed Ne' and second target speed Ne''. The second target speed Ne'' is calculated by multiplying the first target speed Ne' by the previously indicated transmission efficiency $\eta$ of the transmission 14, which efficiency may be a common value obtained during a rapid change in the speed ratio "e" of the transmission 14 during acceleration of the vehicle where the transmission 14 is operated under control of a known control apparatus. Further, the transmission efficiency η used for calculating the second target speed Ne″ may be an average value during periods of acceleration of the vehicle, or may be exactly calculated from time to time based on a rate of variation "ė" in the speed rati "e" of the transmission 14. Then, step S3 which corresponds to the first checking means 79 is performed to check if an acceleration/deceleration flag FV is set at "0" or not. The flag FV represents whether the vehicle is in acceleration or in deceleration, and is set by the flag setting means 81, which executes an interruption routine as shown in FIG. 7 to set the flag FV.

In this interruption routine of FIG. 7, step SW1 is first executed to check if a timer flag FT is set at "1" or not. If the timer flag FT is set at "1", the control goes to step SW2 wherein the running speed V of the vehicle (rotating speed No of the output shaft 20 of the transmission 14) represented by the OUTPUT ROTATION signal SC is stored in the RAM 68. It is noted here that the timer flag FT is set to "1" at a predetermined time interval, whereby the interruption routine is executed in a cyclic fashion. Then, step SW3 is executed to check if the current running speed V of the vehicle is lower than a running speed $V_o$ of the vehicle which was detected in the last cycle of execution of the interruption routine. If the current running speed V is lower than the last speed $V_o$, step SW3 is followed by steps SW4 and SW5 to store the current running speed V as the last running speed $V_o$ for the next cycle (SW4), and to set the acceleration/deceleration flag FV to "0" (SW5), which means that the vehicle is in deceleration. In the case where the current running speed $V_o$ (stored in SW2) is stored as the last speed $V_o$ for the next cycle. Then, the control goes to step SW7 to check if the current running speed V is lower than a predetermined relatively level $V_1$ (e.g., 10 km/h). If the current running speed V is lower than the predetermined low level $V_1$, which means a partial engagement of the clutch 12, step SW7 is followed by step SW5. If the running speed V is higher than the predetermined low level $V_1$, step SW7 is followed by step SW8 wherein the acceleration/deceleration flag FV is set to "1" which indicates that the vehicle is in acceleration.

Referring back to FIG. 6, if the checking in step S3 reveals that the flag FT is set at "0", the step S3 is followed by step S13 in which a speed-ratio control routine 2 is executed as described later in greater detail. If the content of the flag FT is found to be "1" in step S3, the control goes to step S4 to check if the actual engine speed Ne is lower than the first target speed Ne′. If the actual engine speed Ne is not lower than the first target speed Ne′, step S5 is executed to set a flag FN to "1", and the control goes to the previously indicated step S13 to execute the speed-ratio control routine 2. If the actual engine speed Ne is lower than the first target speed Ne′, the control goes to step S6 to check if the actual engine speed Ne is lower than the second target speed Ne″. If the actual engine speed Ne is lower than the second target speed Ne″, steps S7 through S10 are executed. If not, step S6 is followed by step S11. The flag FN is set to "0" in step S7. In the following step S8, the current running speed V is stored in the RAM 68. Then, in the step S9 corresponding to the trigger speed determining means 77, the variation-restraint trigger speed $Ne_1$ is calculated according to a predetermined stored relation of FIG. 4 between the running speed V of the vehicle and the trigger speed $Ne_1$. The variation-restraint trigger speed $Ne_1$ is determined to be lower than the second target speed Ne″, and a comparatively low level within a speed range in which the engine 10 provides a sufficient output necessary to permit smooth acceleration of the vehicle at each running speed V of the vehicle. For example, the variation-restraint trigger speed $Ne_1$ is selected to be close to or within a speed range in which the engine 10 provides its maximum torque. After calculation of the variation-restraint trigger speed $Ne_1$, the step S10 is executed to check if the actual engine speed Ne is lower than the variation-restraint trigger speed $Ne_1$. If the engine speed Ne is lower than the trigger speed $Ne_1$, the step S10 is followed by the step S13, and the control routine 2 is executed. If the actual engine speed Ne has been raised to the variation-restraint trigger speed $Ne_1$, step S11 is performed to check if the flag FN is set at "1" or not. In the case where the checking in step S11 reveals that the flag FN is set at "0", the control goes to step S14. Thus, the step S11 corresponds to the previously indicated flag detecting means 83. Further, the steps S5 and S7 correspond to the previously indicated flag setting means 81, and the steps S4, S7 and S10 which selects the steps S5, S7 and S11 respectively, correspond to the previously indicated second checking means 80 for checking if the engine speed Ne falls within the Ne′-Ne″ range. In the event that the checking in step S11 reveals that the flag FN is set at "1", that is, if the actual engine speed Ne has been raised to the first target speed Ne′, the step S11 is followed by step S12 which corresponds to the selecting means 85. In this step S12, the second target speed Ne″ is selected in place of the first target speed Ne′, whereby the engine speed Ne is lowered from the first target speed Ne′ to the second target speed Ne″. Successively, the step S13 is performed to initiate the speed-ratio control routine 2. On the contrary, if the checking in step S11 reveals that the flag FN is set at "0", i.e., if the engine speed Ne has reached the variation-restraint trigger speed $Ne_1$ (calculated in step S9) during acceleration of the vehicle, the control goes to step S14 to execute the speed-ratio control routine 1.

Figure 8:
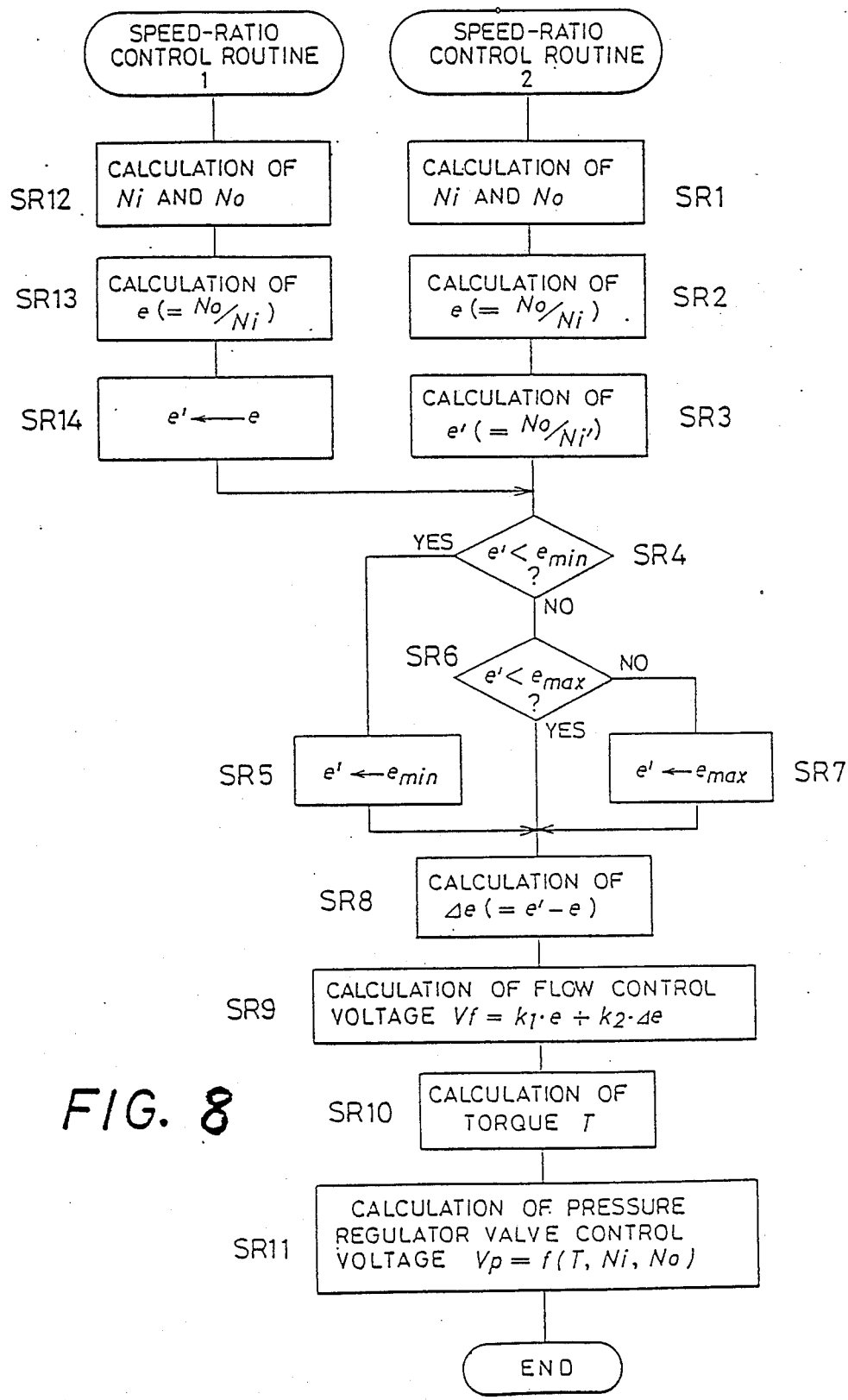

The speed-ratio control routines 1 and 2 are executed in the manner as illustrated in FIG. 8 and as described below.

In the speed-ratio control routine 2, step SR1 is executed at first, wherein the rotating speeds Ni and No of the input and output shafts 16 and 20 of the variable transmission 14 are calculated based on the INPUT and OUTPUT ROTATION signals SE and SC, respectively. Then, step SR2 is executed to calculate the actual speed ratio "e" (=No/Ni) of the variable transmission 14 based on the calculated rotating speeds Ni and No of the input and output shafts 16, 20. Step SR2 is followed by step SR3 in which the target speed ratio "e‴" (=No/Ni′) is calculated, and then by step S4 to check if the target speed ratio "e‴" is lower than a minimum ratio "$e_{min}$". If the ratio "e‴" is lower than the minimum ratio "$e_{min}$", step S5 is executed to set the target speed ratio "e‴" at the minimum ratio "$e_{min}$". If the ratio "e‴" is not lower than the minimum ratio "$e_{min}$", step SR4 is followed by step SR6 to check if the target speed ratio "e‴" is lower than a maximum ratio "$e_{max}$". If the ratio "e‴" is not lower than the maximum ratio "$e_{max}$", step SR6 is followed by step SR7 in which the target speed ratio "e‴" is set at the maximum ratio "$e_{max}$". If the ratio "e‴" is lower than the maximum ratio "$e_{max}$", step SR6 is followed by step SR8.

In step SR8, an error "Δe" (="e'"−"e") is obtained by subtracting the actual speed ratio "e" from the target speed ratio "e'". Then, in step SR9, a flow control voltage Vf to zero the error "Δe" is determined according to the following formula (1):

$$Vf = K_1 \cdot \text{"e"} + K_2 \cdot \text{"Δe"} \tag{1}$$

where, $K_1$ and $K_2$ are constants.

The SPEED RATIO signal SS representing the flow control voltage Vf is applied to the speed-ratio control valve 38, which supplies a controlled flow of the working fluid to the hydraulic cylinder 26 according to the SPEED RATIO signal, whereby the speed ratio "e" of the variable transmission 14 is controlled. Thus, steps SR1 through SR8 correspond to the previously indicated speed-ratio control enabling means 82, and step SR9 corresponds to the previously indicated regulating means 90 for controlling the speed-ratio control valve 38.

Successively, the control goes to step SR10 which corresponds to the engine torque detecting means 92 to calculate the actual output torque T of the engine 10 according to the predetermined relation of FIG. 5. Step SR10 is followed by step SR11 corresponding to the line pressure determining means 94 and the pressure control valve regulating means 96. That is, a pressure control voltage Vp to control the hydraulic line pressure is calculated according to the following formula (2), and the PRESSURE CONTROL signal SP representing the pressure control voltage Vp is applied to the pressure control valve 44, whereby the line pressure is controlled according to the PRESSURE CONTROL signal SP.

$$Vp = f(T, N_i, N_o) \tag{2}$$

In the speed-ratio control routine 1, steps SR12 and SR13 identical to steps SRT1 and SR2 of the control routine 2 are executed to calculate the rotatiang speeds Ni and No of the input and output shafts 16, 20, and to obtain the actual speed ratio "e" (=No/Ni) of the variable transmission 14. Step SR13 is followed by step SR14 in which the target speed ratio "e'" is set at the actual speed ratio "e" obtain in step SR13. Subsequently, the previously discussed steps SR4 through SR11 are carried out. Since the target speed ratio "e'" is set at the actual speed ratio "e" in step SR14, the error "Δe" obtained in SR8 is zero, whereby a variation or change in the speed ratio "e" of the transmission 14 is inhibited. Thus, steps SR14, SR13 and SR14 correspond to the previously indicated speed-ratio control disabling means 84. These steps SR12-SR14 cooperate with the previously indicated steps S3 and S5 to constitute means for restraining a rate of variation in the speed ratio. In this connection, it is possible in step SR14 that the target speed ratio "e'" be set at the actual speed ratio "e" plus a small value α. In this case, the speed ratio "e" of the transmission 14 is gradually changed when the speed-ration control routine 1 is executed.

According to the instant embodiment, the engine speed Ne during acceleration of the vehicle is elevated toward the first target speed Ne'. As shown in solid line in FIG. 9, the rise of the engine speed Ne to the variation-restraint trigger speed Ne₁ is accomplished while the speed ratio "e" of the transmission 14 is varied. However, after the engine speed Ne has exceeded the variation-restraint trigger speed Ne₁, a change in the speed ratio "e" of the variable transmission 14 is inhibited or interrupted until the actual engine speed Ne has reached the first target speed Ne'. In other words, the engine speed Ne is raised relatively slowly from the trigger speed Ne₁ to the first target speed Ne' while the speed ratio "e" of the transmission 14 is held constant, with a result of smooth increase in the vehicle speed V. Therefore, engine noises due to rapid rise in the engine speed Ne are reduced. As soon as the actual engine speed Ne has reached the first target speed Ne', the target speed of the engine 10 is changed from the first target speed Ne' to the second target speed Ne", whereby the engine speed Ne is lowered to the second target speed Ne" which is lower than the first target speed Ne'. As a result, the speed ratio "e" of the transmission 14 is rapidly changed so that the actual engine speed Ne is lowered to the second target speed Ne". In summary, once the engine speed has been raised to the first target speed Ne' during acceleration of the vehicle, the actual engine speed Ne during acceleration of the vehicle is repeatedly changed, i.e., raised and lowered alternately between the first and second target speeds Ne' and Ne" until the intended vehicle speed V is reached. While the engine speed is raised from the second target speed to the first target speed, the rate of variation in the speed ratio of the transmission is restrained.

Figure 9:
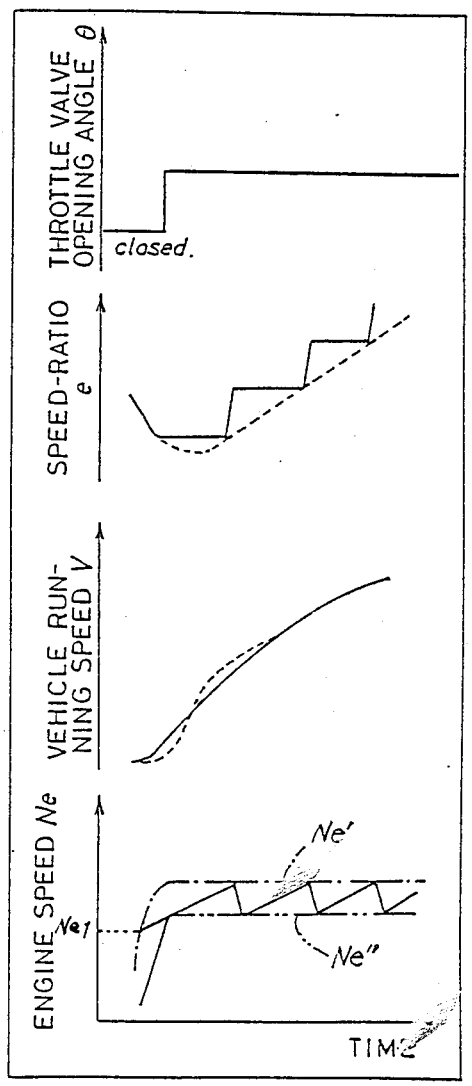
FIG. 9 is a timing chart showing an operational timing and changes in related variables of the embodiment of FIG. 1.

As also shown in solid line in FIG. 9, the change in the speed ratio "e" of the transmission 14 is restrained to a greater extent than in a known apparatus wherein the speed ratio is varied in a considerable degree as shown in broken line in the figure. Hence, according to the present invention, a reduction in the transmission efficiency η due to change in the speed ratio "e" is minimized, and accordingly the fuel economy of the engine 10 is maximized.

As described previously, the second target speed Ne" is determined by multiplying the obtained first target speed Ne' by a predetermined transmission efficiency η. Hence, the acceleration performance or drivability of the vehicle is not influenced as experienced in a known arrangement. In the known arrangement, the transmission efficiency η of the variable transmission 14 is reduced as the speed ratio thereof is varied during acceleration of the vehicle. The output of the engine while the speed ratio "e" is held constant is equal to an output which is obtained at an engine speed that is a product of the first target speed Ne' multiplied by a transmission efficiency η.

In the known apparatus for controlling a variable transmission (14), after the actual engine speed Ne has been raised to a target engine speed (Ne') with an abrupt depression of an accelerator pedal, the vehicle acceleration is effected with some shock irrespective of the timing of the accelerator pedal depression, due to an abrupt change in transmission efficiency η of the transmission (14) upon stopping of variation in the speed ratio "e" and due to an inertia force of the engine 10, as indicated by a vehicle speed curve in broken line of FIG. 9. According to the present embodiment, however, the engine speed Ne is controlled so as to coincide with the first target speed Ne' or the second target speed Ne" in such manner that a change or variation in the speed ratio "e" of the transmission 14 is substantively restrained. As a result, the vehicle running speed is increased smoothly as shown in FIG. 9 by the vehicle speed curve V indicated in solid line, while otherwise possible generation of a shock upon acceleration of the vehicle is minimized.

While the present invention has been described in its preferred embodiment with reference to the accompanying drawing, it is to be understood that the invention is not limited thereto; but may be otherwise embodied.

For example, the invention is applicable to other types of continuously variable transmission than the variable transmission 14 in connection with which the illustrated embodiment has been described.

While an opening angle $\theta$ of the throttle valve 54 is used in the illustrated embodiments to detect a currently required output of the engine 10, it is possible that the required engine output be determined by detecting an amount of operation of the accelerator pedal 52, a vacuum pressure in the intake manifold 51, an amount of fuel injection, or other parameters which represent an output of the engine 10 which is currently required.

While the illustrated embodiments are adapted to inhibit or interrupt a variation in the speed ratio "e" of the transmission 14 during the predetermined time span as described before, it is appreciated that the speed ratio "e" be varied at a very low, i.e., restrained or limited rate for the predetermined time span.

An another modification, the first rotation sensor 60 for detecting a current or actual speed Ne of the engine 10 may be replaced by a sensor disposed on a distributor of the engine 10.

It will be obvious that other changes and modifications of the invention may occur to those skilled in the art within the scope of the invention defined in the appended claims.

What is claimed is:

1. A method of controlling a speed ratio of a continuously variable transmission for a vehicle for transmitting a rotary motion of an engine of the vehicle to drive wheels of the vehicle with a stepless speed change, by regulating the speed ratio of the transmission such that an actual speed of the engine coincides with a target engine speed, said method comprising the steps of:
   determining a first target speed of the engine based on a predetermined currently required output of the engine and according to a predetermined relation between said first target speed of the engine and said required output of the engine, said first target speed of the engine being normally used as said target engine speed to regulate said speed ratio of the transmission;
   detecting a running speed of the vehicle;
   determining a second target speed of the engine based on a predetermined transmission efficiency of the transmission and on said first target speed of the engine, said second target speed of the engine being lower than said first target speed;
   determining a variation-restraint trigger speed of the engine based on the detected running speed of the vehicle and according to a predetermined relation between said variation-restraint trigger speed of the engine and said running speed of the vehicle, said variation-restraint trigger speed being within a range at which the engine provides a sufficient output necessary to permit desirable acceleration of the vehicle at the detected running speed of the vehicle;
   restraining variation in the speed ratio of the transmission during a first time span between a first moment when said actual speed of the engine has exceeded said variation-restraint trigger speed of the engine, and a second moment when said actual speed of the engine has reached said first target speed of the engine, while said vehicle is in acceleration; and
   selecting said second target speed of the engine as said target engine speed when said actual speed of the engine has been raised to said first target speed of the engine with the restrained variation in said speed ratio of the transmission during acceleration of the vehicle, said second target speed of the engine being used to regulate said speed ratio of the transmission during a second time span between said second moment and a third moment when said actual speed of the engine has been lowered to said second target speed of the engine.

2. A method as claimed in claim 1, wherein said target engine speed is changed from said second target speed of the engine to said first target speed of the engine at the end of said second time span, said variation in the speed ratio of the transmission being restrained while the actual speed of the engine is raised from said second target speed of the engine to said first target speed of the engine.

3. A method as claimed in claim 1, wherein said second target speed of the engine is obtained by multiplying said first target speed of the engine by said predetermined transmission efficiency.

4. A method as claimed in claim 1, wherein said continuously variable transmission is a transmission of belt-and-pulley type including a first variable-diameter pulley, a second variable-diameter pulley, and a transmission belt connecting said first and second variable-diameter pulleys.

5. An apparatus for controlling a speed ratio of a continuously variable transmission for a vehicle for transmitting a rotary motion of an engine of the vehicle to drive wheels of the vehicle with a stepless speed change, including regulating means for controlling the speed ratio of the transmission such that an actual speed of the engine coincides with a target engine speed, said apparatus comprising:
   means for determining a first target speed of the engine based on a currently required output of the engine and according to a predetermined relation between said first target speed of the engine and said required output of the engine, said first target speed of the engine being normally used as said target engine speed to regulate said speed ratio of the transmission;
   means for detecting a running speed of the vehicle;
   means for determining a second target speed based on a predetermined transmission efficiency of the transmission and on said first target speed of the engine, said second target speed of the engine being lower than said first target speed of the engine;
   means for determining a variation-restraint trigger speed of the engine based on the detected running speed of the vehicle and according to a predetermined relation between said variation-restraint trigger speed of the engine and said running speed of the vehicle, said variation-restraint trigger speed of the engine being within a range at which the engine provides a sufficient output necessary to permit desirable acceleration of the vehicle at the detected running speed of the vehicle;
   means for restraining variation in the speed ratio of the transmission during a first time span between a first moment when said actual speed of the engine has exceeded said variation-restraint trigger speed of the engine, and a second moment when said actual speed has reached said first target speed of the engine, while said vehicle is in acceleration; and means for selecting said second target speed of the engine as said target engine speed when said actual speed of the engine has been raised to said first target speed of the engine with the restrained variation in said speed ratio of the transmission during acceleration of the vehicle, said second target speed of the engine being used as said target engine speed by said regulating means during a second time span between said second moment and a third moment when said actual speed of the engine has been lowered to said second target speed of the engine.

6. An apparatus as claimed in claim 5, wherein said selecting means changes said target engine speed from said second target speed of the engine to said first target speed of the engine at the end of said second time span, said restraining means restraining said variation in the speed ratio of the transmission while the actual speed of the engine is raised from said second target speed of the engine to said first target speed of the engine.

7. An apparatus as claimed in claim 5, wherein said second target speed of the engine is obtained by multiplying said first target speed of the engine by said predetermined transmission efficiency of the transmission.

8. An apparatus as claimed in claim 5, wherein said continuously variable transmission is a transmission of belt-and-pulley type including a first variable-diameter pulley, a second variable-diameter pulley, and a transmission belt connecting said first and second variable-diameter pulleys.

* * * * *